Jan. 1, 1929.  
M. T. WINTSCH  
1,697,624  
AUTOMATIC TRAIN CONTROL APPARATUS  
Filed Jan. 4, 1927  2 Sheets-Sheet 1
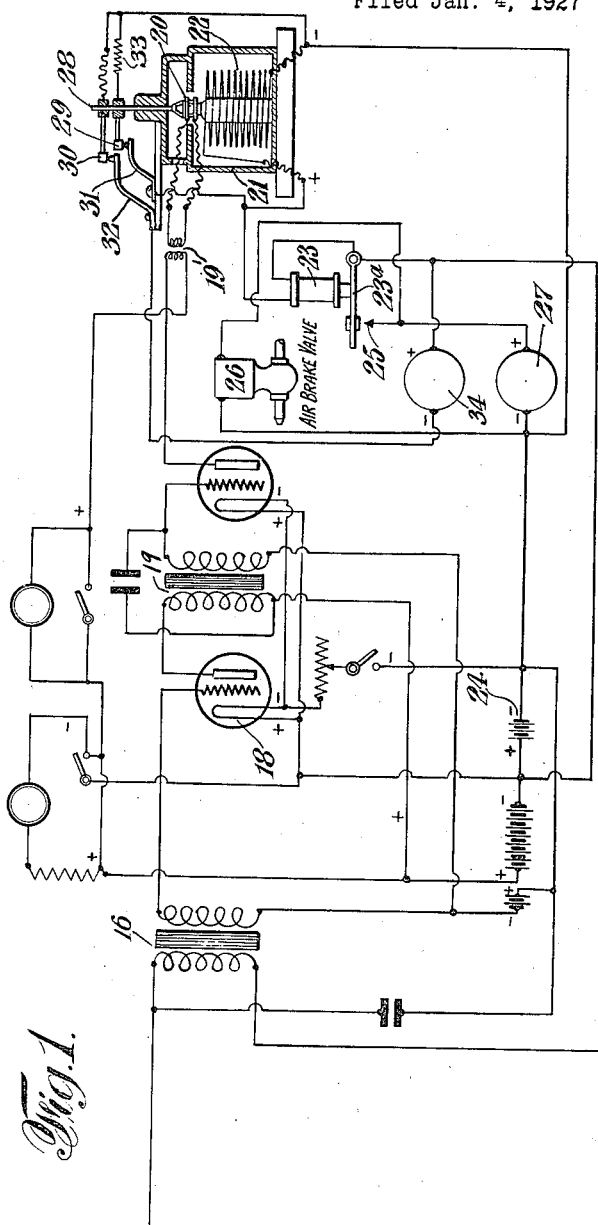
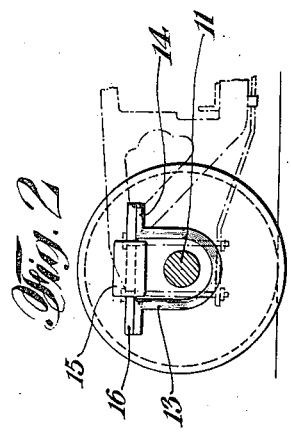
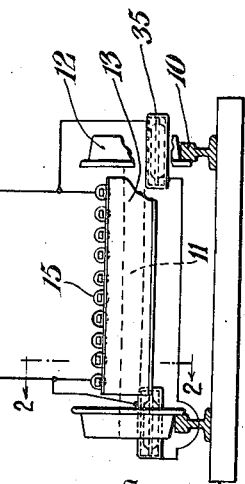
Inventor  
Max Theodore Wintsch  
By his Attorneys  
Kenyon & Kenyon

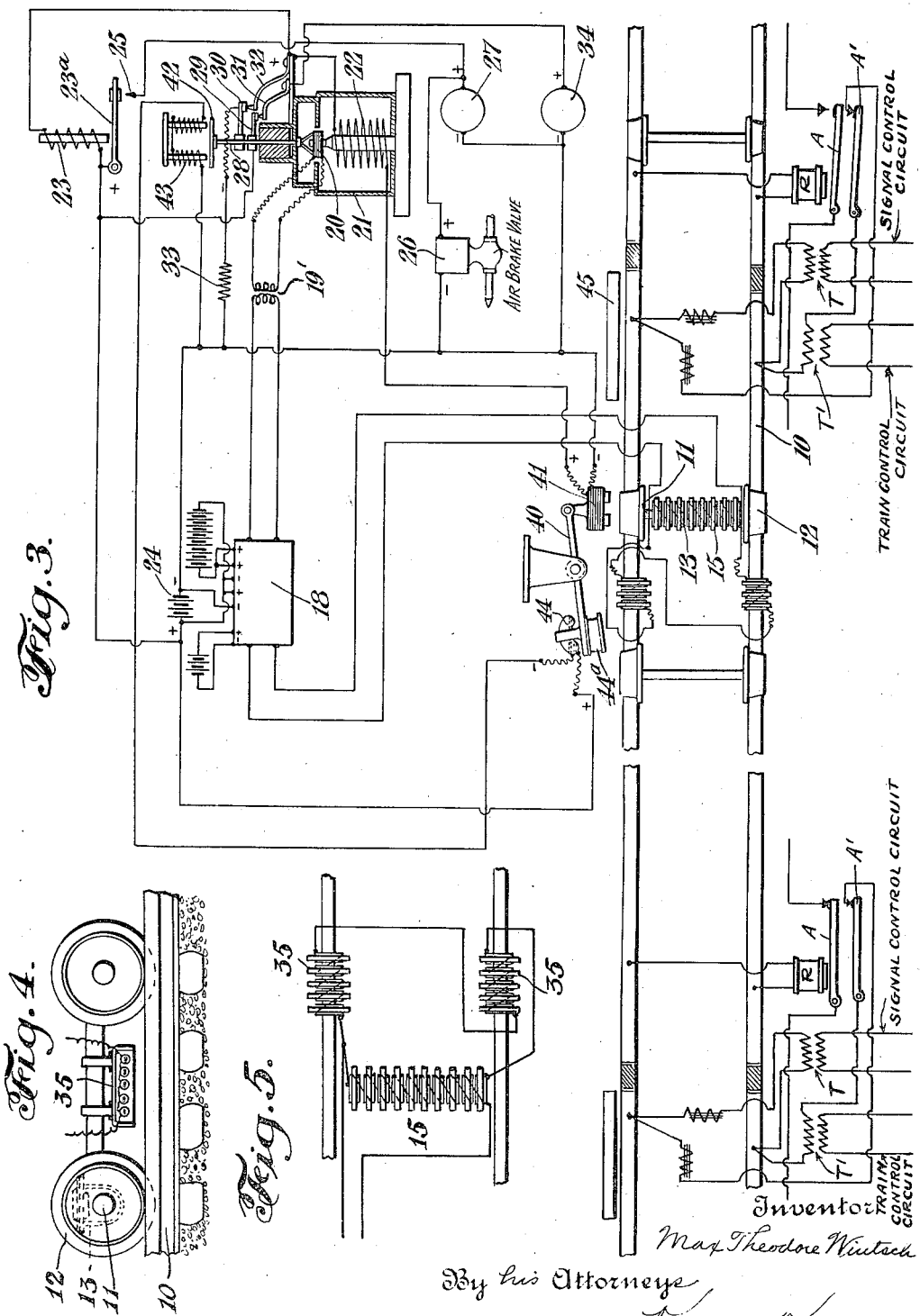

Patented Jan. 1, 1929.

1,697,624

UNITED STATES PATENT OFFICE.

MAX THEODORE WINTSCH OF LANCASTER, PENNSYLVANIA, ASSIGNOR TO THE LOWELL-WINTSCH AUTOMATIC TRAIN CONTROL CORP., OF LANCASTER, PENNSYLVANIA, A CORPORATION OF DELAWARE.

AUTOMATIC TRAIN-CONTROL APPARATUS.

Application filed January 4, 1927. Serial No. 158,857.

This invention relates to automatic train control apparatus and particularly to such an apparatus adapted for use in connection with track circuits in which the rails are maintained at opposite polarity and current is caused to flow from one rail to the other through the wheels and axles of the train.

An object of the invention is a simple, inexpensive and efficient electrically-controlled apparatus which automatically applies the air brakes of a train when it enters a block already occupied by a train or runs past a stop signal and, in one embodiment of the invention, when the track circuit ahead of the train is open; which gives to the engineer visible clear track or danger signals; and, which is effective to apply the brakes upon the opening of any of the circuits or failure of current therein.

According to the invention, an exhaust to atmosphere of the air brake line is controlled by a valve held closed by a solenoid when the latter is energized and which valve opens automatically under the influence of the brake pipe pressure upon deenergization of the solenoid. The energizing circuit of the solenoid is closed through the armature of a relay when the relay is energized and is opened upon deenergization of the relay. The field winding of this relay, which will be termed the "brake relay", is connected in series with the field winding of an electrodynamic relay. The armature of the electrodynamic relay comprises a coil to which is electrically connected the output circuit of a vacuum tube amplifier, the input circuit of which is inductively related to an axle of the engine, preferably the front axle. The field winding of the electro-dynamic relay has a vertical axis and the armature coil which also has a vertical axis is supported for vertical movement toward and away from the upper end of the field winding. When there is no current flowing either in the field winding or the armature coil or there is current flowing in only one of these, the armature coil rests by gravity on top of the field winding. However, when there is current flowing in both the armature coil and the field winding the magnetic fields produced therein oppose each other so that the coil is lifted away from the field winding. The armature coil carries a contact which closes a shunt circuit around the field winding of the electrodynamic relay, when the coil is in its lowered position. When the shunt circuit is open, the current flow through the brake relay is insufficient to cause it to pull up the armature so that the energizing circuit of the solenoid is closed. However, when the shunt circuit is closed, the current flow through the brake relay is sufficiently increased to cause its armature to be pulled up, thereby breaking the energizing circuit of the solenoid, thus permitting application of the brakes. The armature of the electrodynamic relay also carries a second contact which, when the armature is in its lowermost position, closes the circuit through a red lamp, thus indicating danger. A green lamp is arranged in parallel to the solenoid so that, upon closing of the energizing circuit of the solenoid, the green lamp is lighted. Current is supplied to the rails at the exit end of the block so that, when a train is already in the block, practically all the current will be shunted therethrough so that there will be insufficient current available to a train entering the block for sufficiently energizing the armature coil to open the shunt circuit. As a result, the shunt circuit will be closed, thereby energizing the engine relay to open the energizing circuit of the solenoid. This causes the application of the brakes and the lighting of the red lamp. Moreover, if for any reason there be a break in the track circuit or if there be a break in the engine relay circuit, the shunt circuit will be closed, thereby applying the brakes.

Preferably, current is obtained for energizing the armature coil of the electrodynamic relay by enclosing the front axle of the train with a metal sheet bent into U-shape on top of which are supported a plurality of serially-connected coils. Flow of alternating or pulsating direct current through the axle induces current in the input circuit of the amplifier, thereby producing flow of current in the coil of the electrodynamic relay. As long as there is current flowing through the axle, there will be current flowing in the coil. Upon failure of such flow, the coil drops, thereby closing the shunt circuit to effect application of the brakes. There may be provided in parallel with the aforementioned coils, additional coils which are supported above the rails in back of the front axle to pick up additional current from current flowing through that portion of the rails between the first and second wheels of the engine.

Under some circumstances, flow of current through the axles to the rear of the front axle reduces the flow of current through the front axle enough so that the flow of current in the coil of the electrodynamic relay is insufficient to keep it lifted. To overcome this condition, there is provided, in one embodiment of the invention, a holding magnet which is insufficient to draw up the coil of the electrodynamic relay but which, after the latter has been raised, will hold it in raised position. The energizing circuit of this magnet is controlled by a circuit-breaker which is operated automatically at the end of each block to open the circuit. This is accomplished by mounting the circuit-breaker on one end of a lever pivoted to the engine and mounting an electromagnet on the other end and placing an iron rail at the end of the block, so that when the electromagnet approaches the rail, it is attracted thereto, thus operating the circuit-breaker.

Other objects, novel features and advantages of the invention will be apparent from the following specification and accompanying drawings, wherein Figure 1 is a diagrammatic view of one embodiment of the invention;

Fig. 2 is a section taken substantially on the line 2—2 of Fig. 1;

Fig. 3 is a diagrammatic view of a different embodiment of the invention;

Figs. 4 and 5 are detailed views showing the arrangement of the coils.

In Figures 1 and 2, 10 designates the usual rails forming a trackway which is divided into blocks of suitable length, each block being insulated from the one next to it. At the end of each block one rail projects somewhat beyond the other so that the block defining insulations are staggered. At the exit end of each block the rails 10 are connected through the secondaries of the transformers T and T¹ respectively with a source of signal control current and a source of train control current of different frequencies. At the entrance end of each block a standard track relay R is connected across the rails 10 and is provided with an armature A which controls the block signal circuit and an armature A¹ which controls the train control circuit transformer in the next block to the rear. 11 designates an axle of an engine or the like provided with wheels 12 running upon tracks 10. Current is thus shunted through the axle 11 between the tracks 10. A metallic trough-shaped member 13 surrounds the axle 11 and has horizontally-projecting portions 14. Preferably, the member 13 is made up of several laminations of silicon iron. A plurality of serially-connected coils 15 are supported between the upper ends of the member 13 by laminated cores 16 projecting beyond the ends of the coils and attached to the horizontal portions of the member 13. The coils 15 are connected through a transformer 16 with the input of a two-stage vacuum tube amplifier 18. The output circuit of the first stage of the amplifier is connected to the primary of the transformer 19, the secondary of which is connected to the second stage amplifier. The plate circuit of the second stage amplifier leads through the primary of the induction coil 19', the secondary of which is in circuit with the armature 20 of an electrodynamic relay 21, the armature 20 comprising a wire coil. The field winding 22 of the electrodynamic relay 21 is connected in series with the field winding of a relay 23 and with the battery 24 of the amplifier 18. The axis of the winding 22 is vertically arranged and the armature coil 20 is arranged above the upper end of the winding 22 and is capable of vertical movement with respect thereto. When there is no current flowing in either the armature coil 20 or the field winding 22 or current is flowing in only one of them the armature coil rests upon the top of the field winding. However, when there is current flowing in both the armature coil 20 and the field winding 22 the magnetic fields thus produced oppose each other with the result that the coil 20 is lifted with respect to the winding 22. The armature 23ª of the relay 23 engages with the contact 25 when the relay 23 is deenergized to close a circuit including the battery 24, the solenoid 26 and the lamp 27, the solenoid and lamp being connected in parallel. When the relay 23 is energized, the armature 23ª is lifted to open the circuit. A rod 28 extends from the coil 20 through the top of the electrodynamic relay 21 and has insulatedly mounted thereon a pair of contacts 29 and 30 respectively. Insulatedly supported by the top of the electrodynamic relay are conductive arms 31 and 32, the ends of which are arranged to be engaged by the contacts 29 and 30, when the coil 20 is in its low position or resting on the field winding 22. The arm 31 and the contact 29 are electrically connected respectively to the positive and negative ends of the field winding of the electrodynamic relay 21 through a resistance 33. The arm 32 is connected through a red lamp 34 with the positive pole of the battery 24 and the contact 30 is connected to the negative end of the field winding 22 of the electrodynamic relay. The air brake line of the engine is controlled by the solenoid 26, which, when energized, closes the exhaust valve of the brake line but which, when deenergized, permits the valve to open under the influence of the pressure in the line.

The operation of the above-described apparatus which is of the continuous control type is as follows. Assuming that the train is running in a clear block, there will be current flowing through the axle 11, thereby causing a current flow in the coil 20. Consequently, the coil 20 is raised together with the contacts 29 and 30. As a result the red lamp circuit is opened and the shunt circuit around the field winding of the electrodynamic relay including the contacts 29 and 31 is opened. The relay 23 is so designed that when the said shunt circuit is opened the current flowing through the field winding of the relay 23 is insufficient to hold up the armature $23^a$. The armature $23^a$, therefore, is in engagement with the contact 25, thus closing the circuits through the green lamp 27 and the solenoid 26. The brake line exhaust valve is thus kept closed. In passing from one block to another, current flow through the axle 11 is interrupted due to the insulated joints between the ends of the rails in the two blocks. As a result, current ceases to flow in the coil 20, thereby allowing it to drop by gravity to close the red lamp circuit and the shunt circuit around the field winding 22. If there is a train already in the block, substantially all the current is shunted through the axles of said train so that there will be practically no current flow through the axle 11 of an incoming train. The coil 20 will therefore remain in its low position with the contacts 29 and 30 in engagement with the arms 31 and 32. The closing of the shunt circuit around the field winding of the electrodynamic relay causes an increase of current flow in the relay 23 which is sufficient to cause the relay to lift the armature 24, thereby breaking the circuits through the green lamp 27 and the solenoid 26. The exhaust valve is thus permitted to open, thereby applying the brakes. If the block into which the train is entering is clear, the interruption of current flow through the axle 11 is only momentary, so that the red lamp circuit and shunt circuit remain closed only for an instant. Almost immediately, the coil 20 is lifted, breaking the engagement between the contacts 29 and 30 and the arms 31 and 32 and the armature $23^a$ has not had a chance to be lifted.

If there is any break in the track circuit ahead of the train, there will be no flow of current through the axle 11, which as above described will cause an automatic application of the brakes. If there is a break in the circuit of the field winding of the relay 23, a danger indication will be given, for such break would open the circuit through the field winding 22, thereby allowing the coil 20 to drop to close the red lamp circuit. Preferably, only the front axle of the vehicle is equipped with current-collecting means. Tests and measurements made by applicant have shown that the current flow through the other axles is practically negligible. However, in order to take advantage of any current flow which there may be through these axles, a series of coils 35 may be supported from the car body between the first and second axles, slightly above the rails. These coils are connected in series with each other and in parallel to the coils 15. Any flow of current along the rails 10 toward the rear axles will be effected to induce current in these coils and thus strengthen the current supplied to the input of the vacuum tube amplifier.

Under some conditions, the current supplied to the input of the vacuum tube amplifier with the coils disclosed and described above may become insufficient when there are a large number of axles bridging the rails and forming shunt paths. A holding magnet may be provided to keep the coil or armature of the electrodynamic relay in raised position after it is elevated upon going into an unoccupied block. Such an arrangement is disclosed in Fig. 3. In this figure, 10 designates the rails, 11 the engine axle, and 12 the wheels. 13 is the trough-shaped member surrounding the axle and 15 represents the coils. 18 is the vacuum tube amplifier, the output circuit of which is connected by means of an induction coil 19' with the armature coil 20 of the electrodynamic relay 21 having the field winding 22. 23 is a relay, the field winding of which is connected in series with the field winding 22 of the electrodynamic relay 21. The armature $23^a$ of the relay 23 is arranged to engage the contact 25 to close a circuit through the solenoid 26 and the green lamp 27, the solenoid and lamp being arranged in parallel. As before, the solenoid 26 controls the exhaust to atmosphere of the air brake line. The rod 28 connected to the coil 20 has insulatedly mounted thereon contacts 29 and 30 which are arranged to engage with arms 31 and 32 insulatedly supported by the electrodynamic relay 21. The arm 31 is connected through the red lamp 34 with the negative pole of battery 24. The contact 29 is connected to the positive pole of the battery 24. The arm 32 is connected with the positive end of the field winding 22 of the electrodynamic relay 21 and the contact 30 is connected through a resistance 33 with the negative pole of battery 24. Pivotally mounted on the engine is a lever 40 carrying at one end an electromagnet 41, the field winding of which is connected in series with the battery 24 and the field winding 22 of the electrodynamic relay. Actually the pivot of the lever is horizontal and the disclosure in the drawings is merely diagrammatic. The upper end of the rod 28 is provided with an iron plate or bar 42 and over it is arranged an electromagnet 43. A mercury circuit breaker 44 is mounted on the end of the lever 40 opposite the electromagnet 41 and is connected in series with the holding magnet 43. The holding magnet 43 is not of sufficient strength to pull up the coil 20 but is of sufficient strength to hold it up after it has been lifted. Near the exit end of each block is provided an iron bar 45.

The operation of this embodiment, which is of the type known as semi-continuous, is similar in general principles to that disclosed in Fig. 1. Assume that the train is proceeding through a block with the lever 40 in the position shown and with the coil 20 held elevated by the magnet 43. As the end of the block is reached, the attaction between the electromagnet 41 and the bar 45 will cause the lever 40 to be tilted to operate the circuit breaker 44, thus opening the circuit of the field winding of the electromagnet 43. This allows the coil 20 to drop, bringing the contacts 29 and 30 into engagement with the arms 31 and 32. At the same time, current flow is interrupted through the axle 11 because of the insulated joints. If there is a train already in the block, there will be no current flowing through the coil 20 so that it will remain in its low position, keeping the contacts 29 and 30 in engagement with the arms 31 and 32. The red lamp will therefore be lighted and the current flow through 23 will be sufficient to lift the armature 24, thus breaking the circuit through the solenoid 26 and green lamp 27, thereby applying the brakes. Now assume that the block is clear. Current will flow through the coil 20, lifting it to disengage the contacts 29 and 30 from the arms 31 and 32. The lever 40, by virtue of the weight 44ª, will again assume the position shown, thereby closing the circuit through the electromagnet 43. The bar 42 and rod 28 will thus be held in raised position until such time as the circuit breaker 44 is again operated. Disengagement of the contact 30 from the arm 32 opens the shunt circuit around the field winding of the electrodynamic relay 21, thereby reducing the flow of current through the relay 23. As a result, the armature 24 is allowed to drop, thus closing the green lamp circuit and the circuit of the solenoid 26 so that the exhaust valve is kept closed.

I claim:

1. An automatic train control apparatus comprising rails connected to the opposite poles of a source of electric current, a vehicle mounted on said rails and equipped with air brakes, a valve for controlling the application of said brakes, electromagnetic means for holding said valve closed, a relay controlling the energization of said electromagnetic means, an electrodynamic relay having a wire coil for its armature, electrical connections between said coil and an axle of said vehicle, a source of electric current connected in series with the field windings of said relays, a shunt circuit around the field winding of said electrodynamic relay, and means for opening said shunt circuit when the coil is in one position and closing it when the coil is in another position.

2. An automatic train control apparatus comprising rails connected to the opposite poles of a source of electric current, a vehicle mounted on said rails and equipped with air brakes, a valve for controlling the application of said brakes, electromagnetic means for holding said valve closed, a relay controlling the energization of said electromagnetic means, an electrodynamic relay having a wire coil for its armature, electrical connections between said coil and an axle of said vehicle, a source of electrical current connected in series with the field windings of said relays, and a shunt circuit around the field winding of said electrodynamic relay, said shunt circuit being open or closed according to the position of the armature of the electrodynamic relay relative to the field thereof.

3. An automatic train control apparatus comprising rails connected to the opposite poles of a source of electric current, a vehicle mounted on said rails and have air brakes, a valve for controlling the application of said brakes, electromagnetic means for holding the valve closed, a relay for controlling energization of said electromagnetic means, an electrodynamic relay having a wire coil for its armature, a vacuum tube amplifier having its output circuit electrically connected to said armature coil and its input circuit electrically connected to an axle of said vehicle, a source of electric current connected in series with the field windings of said relays, a shunt circuit around the field winding of the electrodynamic relay and means for opening and closing said shunt circuit in response to movement of the armature of said electrodynamic relay relative to the field winding thereof.

4. An automatic train control apparatus comprising rails connected to the opposite poles of a source of electric current, a vehicle mounted on said rails and equipped with air brakes, a valve for controlling the application of said brakes, electromagnetic means for holding said valve closed, a relay controlling the energization of said electromagnetic means, an electrodynamic relay having a wire coil for its armature, electrical connections between said coil and an axle of said vehicle, a source of electric current connected in series with the field windings of said relays, a stationary contact electrically said relays, a stationary contact electrically connected to one end of the field winding of said electrodynamic relay, a second contact adapted to engage therewith and supported from said armature coil, and a connection from said second contact to the opposite end of the field winding of said electrodynamic relay.

5. An automatic train control apparatus comprising rails connected to the opposite poles of a source of electric current, a vehicle mounted on said rails and having air brakes, a valve for controlling the application of said brakes, electromagnetic means for holding the valve closed, a relay for controlling energization of said electromagnetic means, an electrodynamic relay having a wire coil for its armature, a vacuum tube amplifier having its output circuit electrically connected to said armature coil and its input circuit electrically connected to an axle of said vehicle, a source of electric current connected in series with the field windings of said relays, a stationary contact electrically connected to one end of the field winding of said electrodynamic relay, a second contact adapted to engage therewith and supported from said armature coil, and a connection from said second contact to the opposite end of the field winding of said electrodynamic relay.

6. An automatic train control apparatus comprising rails connected to the opposite poles of a source of electric current, a vehicle mounted on said rails and equipped with air brakes, a valve controlling the application of said brakes, electromagnetic means for holding said valve closed, a relay controlling the energization of said electromagnetic means, an electrodynamic relay having a wire coil for its armature, a vacuum tube amplifier having its output circuit electrically connected to said coil and its input circuit electrically connected to an axle of said vehicle, a source of electric current connected in series with the field windings of said relays, a shunt circuit around the field winding of said electrodynamic relay, means for opening and closing said shunt circuit in response to movement of the armature of said relay relative to the field winding thereof, a holding magnet arranged to keep said coil in spaced relation to said field winding, and means for energizing and de-energizing said holding magnet.

7. An automatic train control apparatus comprising rails connected to the opposite poles of a source of electric current, a vehicle mounted on said rails and equipped with air brakes, a valve controlling the application of said brakes, electromagnetic means for holding said valve closed, a relay controlling the energization of said electromagnetic means, an electrodynamic relay having a wire coil for its armature, a vacuum tube amplifier having its output circuit electrically connected to said coil and its input circuit electrically connected to an axle of said vehicle, a source of electric current connected in series with the field windings of said relays, a shunt circuit around the field winding of said electrodynamic relay, means for opening and closing said shunt circuit in response to movement of the armature of said relay relative to the field winding thereof, a holding magnet arranged to keep said coil in spaced relation to said field winding, a circuit breaker included in the energizing circuit of said magnet and electromagnetic means for operating said circuit breaker to de-energize said holding magnet.

8. Brake controlled apparatus for vehicles mounted on rails and equipped with air brakes comprising a valve for controlling the application of said brakes, electromagnetic means for holding said valve closed, a vacuum tube amplifier arranged to control the energization of said electromagnetic means, a closed metallic circuit enclosing an axle of said vehicle and including the cores of a plurality of serially-connected coils, said coils being electrically connected to the input of said amplifier, and a plurality of serially-connected coils supported by said vehicle over each rail to the rear of said axle, said sets of coils being connected in series with each other and in parallel with said first-mentioned coils.

9. An automatic train control apparatus comprising rails connected to the opposite poles of a source of electric current, a vehicle mounted on said rails and equipped with air brakes, a valve for controlling the application of said brakes, electromagnetic means for holding said valve closed, a signal lamp, a relay controlling energization of said electromagnetic means and said signal lamp, an electrodynamic relay having a wire coil for its armature, electrical connections between said coil and an axle of said vehicle, a source of electric current connected in series with the field windings of said relays, a shunt circuit around the field winding of said electrodynamic relay, and means for opening and closing said shunt circuit in response to movement of the armature of said electrodynamic relay relative to the field winding thereof.

10. An automatic train control apparatus comprising rails connected to the opposite poles of a source of electric current, a vehicle mounted on said rails and equipped with air brakes, a valve for controlling the application of said brakes, electromagnetic means for holding said valve closed, a signal lamp, a relay controlling energization of said electromagnetic means and said signal lamp, an electrodynamic relay having a wire coil for its armature, electrical connections between said coil and an axle of said vehicle, a source of electric current connected in series with the field windings of said relays, a shunt circuit around the field winding of said electrodynamic relay, a second signal lamp, a circuit therefor, and means for opening and closing said shunt circuit and said second signal lamp circuit in response to movement of the armature of said electrodynamic relay relative to the field winding thereof.

11. An automatic train control apparatus comprising rails connected to the opposite poles of a source of electric current, a vehicle mounted on said rails and having air brakes, a valve for controlling the application of said brakes, electromagnetic means for holding the valve closed, a signal lamp, a relay for controlling energization of said electromagnetic means and said signal lamp, an electrodynamic relay having a wire coil for its armature, electrical connections between said coil and an axle of said vehicle, a source of electric current connected in series with the field windings of said relays, a stationary contact electrically connected to one end of the field winding of said electrodynamic relay, a second signal lamp, a second stationary contact connected to said signal lamp, a pair of connected to said signal lamp, a pair of contacts adapted to engage with said aforementioned contacts and supported from said armature coil, and connections from said last-named contacts to the opposite end of the field winding of said electrodynamic relay.

12. An automatic train control apparatus comprising rails connected to the opposite poles of the source of electric current, a vehicle mounted on said rails and equipped with air brakes, a valve controlling the application of said brakes, electromagnetic means for holding said valve closed, a relay controlling the energization of said electromagnetic means, an electrodynamic relay having a wire coil for its armature, a vacuum tube amplifier having its output circuit electrically connected to said coil and its input circuit electrically connected to an axle of said vehicle, a source of electric current connected in series with the field windings of said relays, a shunt circuit around the field winding of said electrodynamic relay, means for opening and closing said shunt circuit in response to movement of the armature of said relay relative to the field winding thereof, a holding magnet arranged to keep said coil in spaced relation to said field winding, a circuit breaker included in the energizing circuit of said magnet, a lever pivotally mounted on said vehicle and supporting said circuit breaker at one end, an electromagnet mounted on the other end of said lever, and a rail arranged adjacent one of said aforementioned rails, the field winding of said electromagnet being in series with the field winding of said electrodynamic relay.

In testimony whereof, I have signed my name to this specification.

MAX THEODORE WINTSCH.